Patented Sept. 3, 1946

2,406,868

UNITED STATES PATENT OFFICE 2,406,868

PARAFFIN ISOMERIZATION PROCESS

Carl O. Tongberg, Westfield, and Homer J. Hall, Roselle, N. J., assignors to Standard Oil Development Company, a corporation of Delaware No Drawing. Application August 15, 1941, Serial No. 407,008

18 Claims. (Cl. 260—683.5)

This invention relates to the isomerization of paraffinic hydrocarbons by means of a novel process employing novel catalyst promoter to accomplish the production of iso- or branched chain paraffins from either straight chain or less branched chain paraffins.

The preferred process resides in the isomerization of normal paraffins to isoparaffins using at least one aluminum halide as the catalyst with or without the presence of the usual promoters therefor. These promoters may be free halogens, for example chlorine or bromine, the hydrogen halides, for example hydrogen chloride or hydrogen bromide, the alkyl halides, such as, for example, methyl, ethyl, propyl, butyl, amyl, chlorides or bromides, the alkyl polyhalides, such as, for example, chloroform and carbon tetrachloride, and the like. Water may also be employed as a promoter. It has been customary, in the past, to subject various types of feed stocks predominating in straight chain paraffinic hydrocarbons, particularly of the butane and pentane feeds, to isomerization reactions in order to increase the available quantities of isobutane and isopentane. However, one of the difficulties encountered in the isomerization of normal paraffins containing at least 4 carbon atoms per molecule with aluminum chloride, for example, and hydrogen chloride as a promoter, is the fact that catalyst life is not as great as desired in commercial operation. It has been found that in the ordinary commercial continuous unit for isomerizing, for example normal butane to isobutane in the presence of aluminum chloride and hydrogen chloride, that the catalytic activity of the aluminum chloride, although quite satisfactory at the beginning of its use, is found to be too rapidly degraded to the point where the loss of activity for isomerizing requires that it be discarded and replaced by fresh aluminum chloride. This degradation and loss of activity was thought to be as a result of the building up of contaminants on the surface of the catalyst, thereby reducing the effective contact surface of the catalyst and also to the building up of undesirable complexes between the hydrocarbons and their degradation products with the aluminum chloride.

It now has been discovered that the effective catalyst life of the aluminum chloride can be unexpectedly increased in these commercial operations if the normal paraffin feed stock contacted with the freshly introduced aluminum chloride contains small amounts of the 3 and 4 carbon atom naphthenes. By so conducting an isomerization reaction, for example if normal pentane containing a very small amount of cyclo propane or cyclo butane or their alkyl derivatives such as methylcyclopropane, dimethylcyclopropane, ethylcyclopropane, methylcyclobutane, dimethylcyclobutane and ethylcyclobutane is isomerized with aluminum chloride and one of the conventional promoters, the activity of the catalyst is materially increased over and above that which would ordinarily be expected in the absence of such naphthenes or cyclo aliphatic hydrocarbons. The exact nature of the mechanism of the reaction which results in the increased life of the catalyst is not definitely known. However, it is thought that the naphthenes or their degradation products produced in the reaction zone combine in some manner with the aluminum chloride to produce a complex therewith which, in effect, is the real catalyst for the reaction or which activates secondarily the aluminum chloride in its isomerizing activity of the normal pentane feed stock.

Not only may the reaction be carried out with a feed stock containing the heretofore mentioned naphthenes in small amounts, but as a further modification of the invention, once the catalytic activity of the fresh aluminum chloride has been enhanced by treatment with the naphthene-containing feed stock, the feed stock may be changed in a continuous process from the naphthene-containing feed to one free of naphthenes and composed essentially of the straight chain paraffin or of the straight chain paraffin admixed with small amounts of other paraffinic hydrocarbons without the resultant usual loss of catalytic activity of the aluminum chloride which has been so treated. In other words, once the aluminum chloride has been contacted with a naphthene-containing feed stock, its effective catalyst life thereafter has now been found to be materially increased even though the feed stock which is employed thereafter contains no naphthenes.

As a further embodiment of the invention, it is contemplated to carry out a continuous commercial operation in either liquid phase or vapor phase with or without the presence of elemental or free hydrogen wherein the catalyst during its entire useful life has alternately contacted therewith a feed stock containing normal paraffins of at least 4 carbon atoms per molecule and small amounts of the 3 and 4 carbon atom naphthenes and a naphthene-free paraffinic feed stock containing at least 4 carbon atoms and predominantly of straight chain configuration though not necessarily predominating in the same paraffin as contained in the first mentioned feed stock. The alternate use of these two types of the feed stocks may be so adjusted as to considerably lengthen the catalyst life, and to thereby effectuate an increased yield of desired isomeric products per pound of aluminum chloride employed in the alkylation reaction. The periods of time of the respective feed stocks being contacted with the catalyts alternately as heretofore described will be disclosed in greater detail hereinafter.

It has been found that the naphthenes, cyclopropane and cyclobutane and their alkyl derivatives are equally efficacious in the practice of the present invention regardless of their source of supply. Thus, it is possible to employ as a feed stock for the process, a substantially pure acyclic paraffinic hydrocarbon mixture the constituents of which predominate in straight chain paraffins of at least 4 carbon atoms per molecule and to intermittently add from extraneous sources materials comprising substantially pure cyclopropane and/or cyclobutane, or materials containing predominant paraffinic acyclic hydrocarbons but containing, also, small amounts of the desired naphthenes. As a further modification of this alternative process, it is possible to operate on a feed stock of, for example, normal butane or normal pentane, and to intermittently, as the activity of the catalyst would indicate, change to a similar hydrocarbon mixture containing the desired naphthenes.

Among the naphthene-containing feed stocks found in the oil refining industry may be mentioned the condensation of natural gas to produce casinghead gasoline which is distilled to yield a $C_5$ paraffin cut, followed by the separation of the normal paraffins from the isoparaffins in the $C_5$ cut, and the use of the normal pentane cut as a feed stock in the present process. This stock ordinarily will contain traces of alkyl derivatives of cyclopropane, cyclobutane, and/or its alkyl derivatives. This source of the naphthenes may be employed exclusively as the feed stock for a limited time or as a blending or addition agent to the naphthene-free feed stock ordinarily employed in the manner heretofore indicated. Another suitable source of supply of feed stocks which are found to contain the desired naphthenes may be obtained by the distillation of either paraffinic or preferably naphthenic crude oils to obtain a $C_5$ fraction, followed by the segregation of the normal pentane from the isopentane and the use of this normal pentane fraction, and which contains the desired naphthenes as a feed stock for the reaction. Straight run naphthas with or without small amounts of naphthenes contained therein may also be employed as feed stocks and sources of naphthenes in the present process.

Of course, as heretofore mentioned, naphthenes prepared synthetically or obtained from other sources in more or less pure form may be employed, if desired, in conjunction with feed stocks which do not contain the requisite amounts of naphthenes. The heretofore mentioned sources of normal pentane which naturally contain the desired naphthenes may be used in varying amounts and for varied lengths of time, depending to a large extent upon the amount of the $C_3$ and/or $C_4$ naphthenes contained therein.

When it is desired to operate with a feed stock substantially free of the heretofore discussed naphthenes, the ordinary feeds may be employed. Thus, for example, normal butane, normal pentane, normal hexane, normal heptane, and the higher homologues, may be employed. Such feeds as field butane are likewise desirable. Mixtures of one or more of these heretofore mentioned straight chain paraffinic hydrocarbons are likewise useful in the process, and mixtures which contain substantial amounts of normal paraffins in conjunction with other paraffins are also suitable for use in the present process. As heretofore mentioned these materials as produced from petroleum may contain $C_3$ or $C_4$ naphthenes. These naphthenes can be removed to give a naphthene-free feed stock by treatment with concentrated sulfuric acid, halosulfonic acids such as fluoro- or chlorosulfonic acid, fresh or partially spent $AlCl_3$ or by hydrogenation.

The amount of naphthenes added to the aluminum chloride catalyst should preferably be between about 0.10 and about 4% in the ordinary operation of the process. As previously mentioned, if a greater concentration of naphthene is present, the catalyst becomes over-active too quickly and, as a result, causes excessive degradation of the normal paraffins undergoing isomerization. When the catalyst has absorbed a quantity of naphthenes sufficient to bring its activity to the desired level the addition of naphthenes can be discontinued until such time as the catalyst activity materially decreases when used in the isomerization of a naphthene-free normal paraffin of at least 4 carbon atoms.

Superatmospheric pressure is customarily employed in order to maintain a liquid phase operation, although it is to be distinctly understood that vapor phase operations are likewise contemplated in connection with the present invention. The superatmospheric pressures may be imposed sufficient to maintain a liquid phase operation under the reaction conditions obtained, and it may also be desired to use pressures up to as high as 1000 lbs./sq. in. when operating in either liquid or vapor phase. These pressures are designed to suppress the tendency toward cracking, the degradation of the hydrocarbons treated, particularly where the hydrocarbons treated are of higher molecular weights, for example, the hexanes and heptanes and to give increased contact times and throughputs. The pressures may be obtained partially by the use of the halogen-containing promoters heretofore mentioned, or they may be also attained by the introduction of free or molecular hydrogen either alone or in conjunction with the halogen-containing promoters. To prevent excessive activity of the catalyst, thereby resulting in excessive degradation of the feed stock, molecular hydrogen has been found to be particularly effective.

The reaction conditions are those customarily employed when carrying out paraffinic isomerization reactions in the presence of aluminum chloride or aluminum bromide. The quantity of catalyst may be varied between about 1 and about 150% by weight based on the paraffin maintained in the reaction zone at any one time. In vapor phase operation the amount of catalyst may be much higher. Optimum catalyst concentrations vary depending upon the other reaction conditions maintained. Preferably a catalyst concentration between about 15 and about 70% by weight is sufficient in liquid phase operation. Likewise, the amount of promoter employed, may vary considerably, for example, between about 2 and about 24% by weight of the hydrocarbon present in the reaction zone at any one time but preferably it is maintained between about 4 and about 10%. The temperature of the reaction zone is maintained dependent, of course, upon the other reaction conditions, usually between about 60 and about 300° F., preferably between about 100 and about 225° F. for liquid phase operation. In vapor phase operation the temperature of the reaction zone may be maintained at between about 150° F. and about 500° F. preferably between about 275 and about 375° F. These temperatures are customarily employed with normal butane isomerization reactions. However, in the case of normal pentane, a somewhat less drastic temperature condition is customarily employed. However, in the present case, where it may be desirable to employ a $C_5$ feed stock when contacting the catalyst with naphthenes and a $C_4$ feed stock when contacting the naphthene activated catalyst with isomerizing reactants, the temperatures may vary as between the various types of feed stocks so as to maintain optimum reaction conditions for each type of feed stock. On the other hand, the reaction conditions may be maintained constant, regardless of the feed stock employed except that the time of contact may be varied to suit the particular feed stock. Thus, for example, if the catalyst zone is maintained at a temperature of 75° F. and it is desired to have the temperature maintained regardless of the feed stock, the treatment of the catalyst with a naphthene-containing feed stock, for example, a $C_5$ normal pentane containing something like 1% or less of $C_3$ and $C_4$ naphthenes, may be contacted at the rate of between about 1 or 2 hours until the catalyst activity is such that further treatment with this feed stock will result in excessive degradation of the normal pentane. At the end of this time, the temperature and amount of catalyst is allowed to remain the same and a naphthene-free feed stock, say, for example, normal butane, is contacted under the same reaction conditions except that the time of residence of the normal butane in contact with the aluminum chloride may be somewhat lengthened, say to 2 or 3 hours, dependent upon the activity of the particular catalyst mass. Ordinarily, the time of contact will be between about 0.1 and about 20 hours, usually between about 2 and about 10 hours, for liquid phase operation and between about 15 seconds and about 15 minutes preferably between about 20 seconds and about 3 minutes for vapor operation depending, of course, as heretofore mentioned, upon the other reaction conditions.

A number of reactors may be employed in series or in parallel so that the feed stocks may be interchangeably fed to the various reactors so that while one catalyst mass is undergoing treatment with a naphthene-containing feed, another which has been activated in this manner may be activating the isomerization of a feed stock containing no naphthenes. A differential in reaction conditions to suit the optimum isomerizing activity of the particular feed stock may conveniently be maintained where a plurality of reactors is employed where such could not be readily accomplished in a commercial operation if a single reactor were employed. Mechanical means for agitating the contents of the reactors when liquid phase operation is employed may be by such devices as motor driven propellers, jets of restricted internal diameter, turbo mixers, and the like. A percolation of the liquid feed stock through a bed of solid catalyst may also be employed. Likewise for vapor phase operation, a bed of catalyst is employed.

The treatment of the reacted mixture upon removal from the isomerization reactor or reactors is well known in the art and generally embodies the stripping of the promoter from the reacted mixture followed by the removal of any residual amounts of aluminum chloride or aluminum chloride complex, as the case may be, and the separation of the unreacted portion of the reacted mixture from the isomeric products produced in the reaction by convenient means such as, for example, fractionation together with the recycle of the promoter to the isomerization reactors with the optional recycle of unreacted reactants as well.

As one mode of carrying out the invention, a feed stock of normal pentane with and without traces of naphthenes will be described. A feed stock containing no naphthenes and composed predominantly of normal pentane under a given set of reaction conditions with aluminum chloride and promoter will give a 50% conversion of normal pentane to isopentane. Under similar conditions, wherein the normal pentane contains from one-tenth to 1% of naphthenes, particularly cyclopropane and/or cyclobutane, a conversion of about 75% of the normal pentane contacting the catalyst will be attained with a gradual increase in catalyst activity to the point where excessive degradation of the normal $C_5$ feed will occur. In operating the process, and in order to maintain the activity of the catalyst, one of two possible courses of action are desirable. When the catalyst activity becomes excessive with normal pentane, the feed stock may then be shifted to a normal butane isomerization in which no naphthenes are contained, in which case the over activity of the catalyst is, to some extent, alleviated by the fact that normal butane is more difficult to isomerize than normal pentane, or the catalyst may be contacted under the same or milder conditions with normal pentane substantially free of naphthenes for such a length of time that the conversion governed, of course, by the catalytic activity, drops to, say 30 or 40% depending upon the desired economical operation of the process. It should be understood, of course, that if the activity level of the catalyst is not of any economical importance, the conversion may be dropped to 20 or 25% or even lower, if desired. Once the catalyst activity has dropped to this point, it may be restored to somewhere near the original activity by re-feeding the naphthene-containing normal pentane until the activity has once again risen to somewhere around a conversion of 75%. This procedure as described may be repeated until the catalytic activity is no longer capable of being restored, in which case the catalyst is discarded and new catalyst employed.

Where it is desirable to accurately control the amount of naphthenes entering into contact with the aluminum chloride, it may be advantageous to remove all naphthenes from the feed stock and introduce controlled amounts thereof for a better control of the catalyst activity. In order to remove the naphthenes from a normal paraffin containing at least 4 carbon atoms per molecule, treatment with such compounds as concentrated sulfuric acid, fluor and chlor sulfonic acids, and the like, are found to effectively remove the naphthenes.

As illustrative of the increased activity of the catalyst when employing small amounts of naphthenes, the following example is presented although it is obviously not intended that the invention be limited thereto.

Example

A shaking bomb of 500 cc. capacity was charged with 150 grams of substantially pure normal pentane, about 150 grams of aluminum chloride, 2.25 grams of cyclopropane, and between about 3 and about 4% of hydrogen chloride. The mixture was heated to a temperature of about 78° and shaken for about 3 hours, at the end of which time the reacted product was found to contain isopentane to the extent that about 73% of the normal pentane had been converted. Under similar conditions, using fresh aluminum chloride but in which no cyclopropane was present, the normal pentane reacted to the extent of only about 44%.

As an example of the promotional effect of naphthenes present in paraffinic feed stocks, the normal conversion of a n-pentane feed using 100% $AlCl_3$, 22% HCl, a temperature of 75° F., with 2 hours shaking is about 75% whereas when the naphthenes present are removed by pretreating the feed with sulfuric acid, fluor- or chlorosulfonic acid or by hydrogenation treatment only 44%, 50%, 51% and 48% conversion respectively is obtained.

Having now thus fully described and illustrated the character of the invention, what is claimed as new and useful and desired to be secured by Letters Patent is:

1. A process which comprises contacting at least one normal paraffin containing at least 4 carbon atoms per molecule in the presence of an aluminum halide under isomerization reaction conditions and in the presence of a halogen-containing promoter and a small amount of a naphthene taken from the group consisting of cyclopropane, cyclobutane and alkyl derivatives thereof, said three- and four-membered ring naphthenes being substantially the only naphthenes present.

2. A process which comprises carrying out a process as in claim 1 wherein superatmospheric pressure is maintained by the use of molecular hydrogen.

3. A process as in claim 1 wherein the naphthene is present in an amount between about 0.1 and about 4% by weight of the feed.

4. A process which comprises contacting at least one normal paraffin containing at least 4 carbon atoms per molecule in the presence of aluminum chloride under isomerization reaction conditions and in the presence of at least one hydrogen halide and a small amount of a naphthene taken from the group consisting of cyclopropane, cyclobutane and alkyl derivatives thereof, said three- and four-membered ring naphthenes being substantially the only naphthenes present.

5. A process which comprises contacting normal pentane in the presence of aluminum chloride and hydrogen chloride under isomerizing reaction conditions while maintaining in the reaction zone a small amount of at least one naphthene taken from the group consisting of cyclopropane, cyclobutane and alkyl derivatives thereof, said three- and four-membered ring naphthenes being substantially the only naphthenes present.

6. A process as in claim 5 wherein the naphthene is present in an amount between about 0.1 and about 4% by weight of the feed.

7. A process which comprises contacting normal butane in the presence of aluminum chloride and hydrogen chloride under isomerizing reaction conditions and in the presence of a small amount of at least one naphthene taken from the group consisting of cyclopropane, cyclobutane and alkyl derivatives thereof, said three- and four-membered ring naphthenes being substantially the only naphthenes present.

8. A process as in claim 7 wherein the naphthene is present in an amount between about 0.1 and about 4% by weight of the feed.

9. A process which comprises isomerizing a normal paraffin containing at least 4 carbon atoms per molecule substantially free of naphthenes under isomerizing reaction conditions in the presence of a promoter and a catalyst mass formed by treating aluminum chloride under isomerization reaction conditions with a feed stock containing small amounts of at least one low molecular weight naphthene taken from the group consisting of cyclopropane, cyclobutane, and alkyl derivatives thereof and discontinuing the treatment prior to the activity of the catalyst becoming such as to cause excessive degradation of normal paraffins containing at least 4 carbon atoms per molecule under isomerization reaction conditions.

10. The process as in claim 9 wherein normal pentane is employed as the feed stock.

11. The process as in claim 9 wherein superatmospheric pressure is maintained by introducing molecular hydrogen.

12. A process which comprises contacting a normal paraffin containing at least 4 carbon atoms per molecule under isomerization reaction conditions in the presence of a small amount of a low molecular weight naphthene taken from the group consisting of cyclopropane, cyclobutane, and alkyl derivatives thereof, a promoter, and an aluminum halide followed by the contacting of the resulting catalyst mass with a naphthene-free feed stock comprising essentially at least one normal paraffin containing at least 4 carbon atoms under isomerization reaction conditions and in the presence of a promoter.

13. A process as in claim 12 wherein a continuous process is carried out in which the catalyst is contacted alternately with a naphthene-containing feed stock and a naphthene-free feed stock.

14. A process which comprises contacting normal pentane containing at least one naphthene taken from the group consisting of cyclopropane, cyclobutane and alkyl derivatives thereof with aluminum chloride in the presence of hydrogen chloride under isomerization reaction conditions for a period of time only sufficient to maintain about a 75% conversion of the normal pentane to isopentane followed by contacting the catalyst with a normal $C_5$ paraffin hydrocarbon fraction substantially free of naphthenes under isomerization reaction conditions and in the presence of hydrogen chloride and recovering isopentane.

15. A process as in claim 14 wherein the naphthene-free feed stock comprises field butane.

16. A process which comprises contacting continuously aluminum chloride under isomerizing reaction conditions with a normal pentane feed stock containing at least one low molecular weight naphthene taken from the group consisting of cyclopropane, cyclobutane, and alkyl derivatives thereof until the catalytic activity has increased to a high level followed by the treatment of the resultant catalyst mass with normal butane substantially free of naphthenes until such time as the catalytic activity of the catalyst mass is reduced substantially and alternately and continuously contacting the catalytic mass with the naphthene-containing feed and the naphthene-free feed until the catalytic activity of the catalyst has become substantially completely spent.

17. A process as in claim 16 wherein sufficient superatmospheric pressure is maintained to insure liquid phase operation.

18. A process as in claim 16 in which the reaction is carried out in the vapor phase and the catalyst mass constitutes a plurality of beds.

CARL O. TONGBERG.
HOMER J. HALL.